C. PHILLIPS.
APPARATUS FOR FIRING BARRELS.
APPLICATION FILED OCT. 19, 1912.
1,052,512.
Patented Feb. 11, 1913.
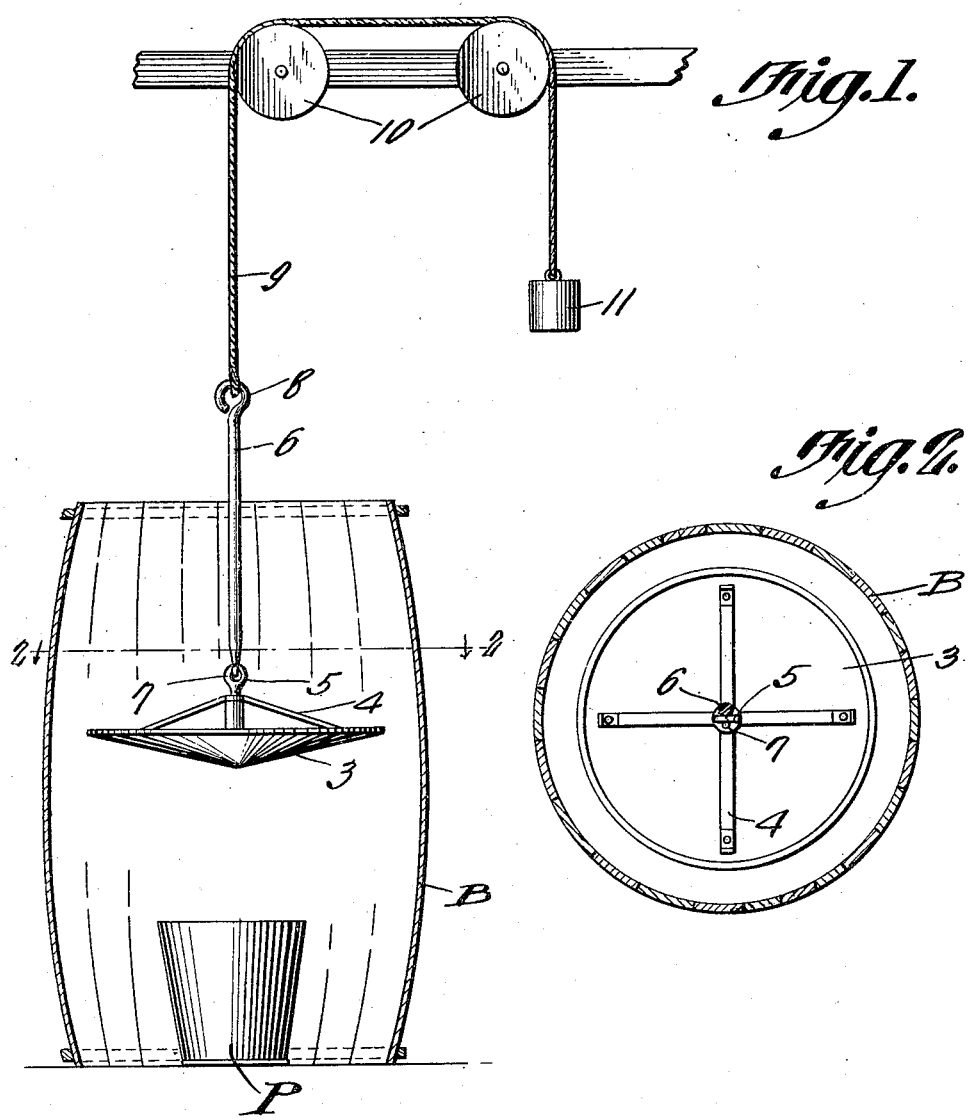
Witnesses
Charles Phillips, Inventor
by C. A. Snow & Co.
Attorneys

UNITED STATES PATENT OFFICE.

CHARLES PHILLIPS, OF LOUISVILLE, KENTUCKY.

APPARATUS FOR FIRING BARRELS.

1,052,512.  Specification of Letters Patent.  Patented Feb. 11, 1913.

Application filed October 19, 1912. Serial No. 726,848.

*To all whom it may concern:*

Be it known that I, CHARLES PHILLIPS, a citizen of the United States, residing at Louisville, in the county of Jefferson and State of Kentucky, have invented a new and useful Apparatus for Firing Barrels, of which the following is a specification.

The present invention appertains to an apparatus or device for firing barrels, and aims to provide a simple and inexpensive apparatus of this character, which shall be convenient, efficient and practical in use, and which shall effect an even distribution of the heat so as to provide economy in the quantity of fuel required.

To the above and other ends, the present apparatus resides essentially in a heat spreader, and means for lowering or raising the same within an upright barrel, to distribute the heat rising upwardly in the barrel evenly against the interior walls of the barrel and tending to retain the heat within the barrel.

The present invention also resides in other details of construction and combination of component parts as will hereinafter be more fully described, it being understood that changes in the precise embodiment of the invention herein disclosed can be made within the scope of what is claimed without departing from the spirit of the invention.

The preferred embodiment of the invention has been illustrated in the accompanying drawings, wherein:—

Figure 1 is an elevation of the apparatus, as in use, the barrel being shown in section. Fig. 2 is a sectional view taken on the line 2—2 of Fig. 1.

Referring specifically to the drawing, the heat spreader has been designated by the numeral 3, the same being stamped or otherwise fashioned from sheet metal or other suitable material so as to assume an inverted conical contour. This spreader or deflector is smaller in diameter than the barrel which is to be fired or heated, and to the said spreader is secured a spider 4 carrying a central eye 5.

The means for raising and lowering the spreader within the barrel consists in a rod 6 having a hook 7 at its lower end engaging in the eye 5 of the spider and having an eye 8 at its upper end to which one end of the cable or other flexible member 9 is attached, this cable being trained over a pair of pulleys 10 and having a counter weight 11 secured to its other end. The counter weight 11 serves to maintain the spreader at any position to which it is set and permits the spreader to be readily raised and lowered.

In use, the barrel to be fired, as designated by the letter B in Fig. 1, is set on end or placed upright, and a fire pot P is placed within the barrel and at its lower end, this fire pot containing coke or other heat producing agent. The heat given off by the fire pot will rise axially within the barrel and will strike the center of the spreader or deflector 3, so that the heat will be spread evenly or uniformly against the interior walls of the barrel. The spreader will also tend to retain the heat within the barrel, so as to economize in fuel, and the spreader may be readily raised and lowered to fire the various vertical portions of the barrel, as will be understood. The spreader may also be readily raised out of the barrel to permit the barrel to be withdrawn and to permit a new barrel to be put in position, so that the spreader may be lowered thereinto. In the manner described, the present apparatus may be employed for conveniently, efficiently and rapidly firing barrels, of various characters, the breakage of the staves being eliminated, and it being apparent that the objects aimed at have been attained in a satisfactory and desirable manner.

Having thus described the invention, what is claimed as new is:—

1. An apparatus for firing barrels comprising a heat spreader, and means for lowering and raising same within an upright barrel, to distribute the heat rising upwardly in the barrel evenly against the interior walls of the barrel and tending to retain the heat within the barrel.

2. An apparatus for firing barrels comprising an inverted conical heat spreader, and means for lowering and raising same within an upright barrel, to distribute the heat rising upwardly in the barrel evenly against the interior walls of the barrel and tending to retain the heat within the barrel.

3. An apparatus for firing barrels comprising a dished sheet metal spreader, a spider secured thereto, and means connected to the spider for lowering and raising the spreader within an upright barrel, to distribute the heat rising upwardly in the barrel evenly against the interior walls of the barrel and tending to retain the heat within the barrel.

In testimony that I claim the foregoing as my own, I have hereto affixed my signature in the presence of two witnesses.

CHARLES PHILLIPS.

Witnesses:
H. A. LA RUE,
W. B. BOOTH.

Copies of this patent may be obtained for five cents each, by addressing the "Commissioner of Patents, Washington, D. C."